(12) United States Patent
Otani et al.

(10) Patent No.: US 6,391,233 B1
(45) Date of Patent: May 21, 2002

(54) METHOD OF PRODUCING A POROUS PRODUCT

(75) Inventors: Kunihiko Otani, Akashi; Mizuho Maeda; Hideo Takamatsu, both of Kamisu-machi; Kazuhisa Takagi; Masashi Nemoto, both of Izumizaki-mura, all of (JP)

(73) Assignees: Asahi Rubber Inc., Saitama; Plinst Giken Co., Ltd., Akashi, both of (JP)

( * ) Notice: Subject to any disclaimer, the term of this patent is extended or adjusted under 35 U.S.C. 154(b) by 0 days.

(21) Appl. No.: 09/597,296

(22) Filed: Jun. 20, 2000

(30) Foreign Application Priority Data

Jun. 24, 1999 (JP) ............................................. 11-178893

(51) Int. Cl.$^7$ ............................................... B29C 67/20
(52) U.S. Cl. ......................................... 264/49; 264/344
(58) Field of Search ................................... 264/49, 344

(56) References Cited

U.S. PATENT DOCUMENTS 4,076,656 A 2/1978 White et al.
5,059,630 A * 10/1991 Fujita et al. .................. 264/49
5,677,355 A 10/1997 Shalaby et al.

FOREIGN PATENT DOCUMENTS

JP 55-746 * 1/1980

OTHER PUBLICATIONS

Database WPI, Section Ch, Week 198528 Derwent Publication Ltd., London, GB, Class A35, AN 1985–167770, XP–002147462 JP 60–096443 A (Pentel KK), May 30, 1985, Abstract.

* cited by examiner

Primary Examiner—Allan R. Kuhns
(74) Attorney, Agent, or Firm—Smith Patent Office

(57) ABSTRACT

A novel method of producing a porous product is provided, including the steps of: preparing a molded product by subjecting a molding material comprising a polymer component and a pore-forming agent dispersed in the polymer component, the pore-forming agent assuming a solid state at a room temperature, to molding at a temperature which causes the pore-forming agent to melt; and soaking the molded product with a solvent which dissolves the pore-forming agent but fails to dissolve the polymer component, to form pores.

8 Claims, No Drawings

METHOD OF PRODUCING A POROUS PRODUCT

BACKGROUND OF THE INVENTION

1. Field of the Invention

The present invention relates to a method of producing a porous product and, more specifically, to a method that is capable of producing a porous product having a porosity as high as but not less than 50% by volume and controlling the porosity thereof by the use of a conventional injection molding machine or a conventional extruder. Further, the porous product produced according to the method of the present invention may be brought into direct contact with a human body.

2. Discussion of the Related Art

One known method of producing a porous product uses a molding material formed by mixing a resin with a volatile blowing agent such as carbon dioxide gas or ammonia gas, or a decomposable blowing agent such as azodicarbondiamide or dinitrosopentamethylenetetramine. With this method, the blowing agent is volatilized or decomposed in a heat-molding process to generate gas, which in turn forms pores.

In general, the method using a blowing agent for formation of pores produces porous products of the type having closed cells and, hence, is unsuitable for the production of porous products requiring a gas permeability. Also, such a method, in general, is prone to form individually larger pores or cells and, hence, is unsuitable for the production of porous products requiring higher functional characteristics such as cushioning characteristics or sound insulating characteristics. Further, since all of the blowing agent is not necessarily expanded, it is possible that some unexpanded blowing agent remains in the resulting porous product. Such residual blowing agent not only makes it difficult to estimate porosity of a resulting porous product but it also prevents the resulting porous product from being used in an application where the porous product is brought into direct contact with a human body, for example, as an ear plug, if the blowing agent contains ammonia, dinitrosotetamine or a like substance which is harmful to a human body.

A typical method of producing a form rubber comprises admixing of a blowing agent and a coagulant with a latex, and molding the resulting mixture. On the other hand, a typical method of producing a porous product such as urethane foam composes molding of a molding material formed by mixing a prepolymer with a blowing agent such as Freon or water as well as a catalyst for a curing reaction. These methods utilize a pore-forming mechanism relying upon the generation of gas volatilized from the blowing agent and, therefore, involve problems similar to those described above.

A method of producing a porous product such as an expanded polyethylene includes irradiation of a resin with an electron beam to cause the resin to be crosslinked while expanding a blowing agent. Although such a method is capable of controlling the porosity of a porous product, the electron beam irradiation results in an increased production cost. Besides, the problem of the residual blowing agent is still left unsolved.

A less costly method of producing a porous product enabling estimation and control of the porosity of a resulting porous product has been proposed. This method comprises the steps of: adding a powdery pore-forming agent such as sodium chloride or sodium sulfide (hereinafter referred to as a "salt-type pore-forming agent") to a resin or rubber to form a molding material; subjecting the molding material to molding to provide a molded product; and washing the resulting molded product with water to elute the salt or the pore-forming agent thereby forming pores. Such a method is called a "desalting method".

In a desalting method, since portions from which the pore-forming agent has been eluted become pores, and since the pore-forming agent itself is not expanded or foamed in the molding process, it is required that the molding material contain the pore-forming agent in an amount corresponding to the intended porosity. Accordingly, where a porous product having a porosity of 50% is to be produced, the pore-forming agent needs to be added to the resin component so that the volume ratio of the pore-forming agent in the resulting molding material assumes 50% or more by volume.

It is, however, difficult to mold such a molding material containing 50% or more by volume of the salt-type pore-forming agent. Specifically, the salt-type pore-forming agent remains in a solid state or powdery state at a typical molding temperature of resin because of its higher melting point. For this reason, the fluidity of a molding material decreases with a higher content of the salt-type pore-forming agent, and a molding material containing 50% or more by volume of the salt-type pore-forming agent fails to exhibit a fluidity (MFR value) required for molding. In injection molding or extrusion molding, in particular, the salt-type pore-forming agent in a powdery state cannot be sufficiently extruded or injected though the hydraulic resin component in the molding material that is to be extruded through an extrusion die or to be injected into a mold. This will result in a molded product containing the pore-forming agent in a lower amount, or in a non-homogeneous molded product containing the pore-forming agent which is rich in an inner part but lean or absent in a superficial part of the product, despite the pore-forming agent being abundantly contained in the molding material. Naturally, a decrease in the content of the pore-forming agent leads to a decrease in the porosity of a molded product. Further, such a non-homogeneous molded product gives a non-homogeneous porous product which eventually has a lower porosity than desired because the pore-forming agent is not sufficiently eluted by soaking due to the presence of too small an amount of the pore-forming agent in the superficial part of the molded product.

It is conceivable to improve the fluidity of the polymer component by raising the molding temperature. Even in this case, the salt-type pore-forming agent remains in a powdery state in the molding material and, hence, the pore-forming agent is difficult to extrude or inject as compared with the polymer component when the molding material is extruded through an extrusion die or injected into a mold, thus, resulting in a molding product containing a lower amount of pore-forming agent than desired.

SUMMARY OF THE INVENTION

An object of the present invention is to provide a method of producing a porous product which is capable of molding using a molding material containing an abundance of a pore-forming agent and controlling the porosity of an intended porous product as desired.

The inventors have studied a method which is capable of producing a porous product of which pores are individually minute and homogeneously distributed over the entirety of the porous product, and have found that the use of a pore-forming agent which assumes a solid state at room temperatures but can be melted into a liquid state at a molding temperature of a polymer component that will form the skeleton of the porous product, enables satisfactory molding without a decrease in the fluidity of a molding material as experienced in the prior art even when the amount of the pore-forming agent is increased in the molding material.

The present invention provides a method of producing a porous product which comprises the steps of: preparing a molded product by subjecting a molding material containing a polymer component and a pore-forming agent dispersed in the polymer component, the pore-forming agent assuming a solid state at a room temperature, to molding at a temperature which causes the pore-forming agent to melt; and soaking the molded product with a solvent which dissolves the pore-forming agent but fails to dissolve the polymer component, to form pores.

DETAILED DESCRIPTION OF THE PREFERRED EMBODIMENTS

First, a molding material to be used in the present invention will now be described in detail.

The molding material comprises a polymer component and a pore-forming agent dispersed in the polymer component, the pore-forming agent assuming a solid state at room temperatures.

The pore-forming agent may be any compound that assumes a solid state at a room temperature and can melt at a molding temperature. Hereinafter, the pore-forming agent for use in the present invention will be termed a "meltable-type pore-forming agent" for distinction from the salt-type pore-forming agent used in the prior art. The molding temperature varies depending on the polymer component to be used to form the skeleton of an intended porous product. As will be described later, the present invention uses polymer components that are generally moldable at about 100° C. to about 300° C. Accordingly, usable as the meltable-type pore-forming agent are compounds, preferably organic compounds, that melt at 100° C. to 300° C. Specifically, organic compounds having respective melting point between about 40° C. and about 300° C. are used. Preferably, such organic compounds are polyvalent alcohols.

If the melting point is higher than the above range, the molding temperature needs to be set considerably higher than the melting temperature of the polymer component, resulting in a danger of burning or thermal decomposition of the polymer component. Besides, this case uses energy wastefully. Although the salt-type pore-forming agent used in the prior art desalting method can melt into a liquid, the meltable-type pore-forming agent for use in the present invention characteristically melts at about the molding temperature of the polymer component. The salt-type pore-forming agent is an inorganic compound which has a higher melting point and, hence, as molding process requiring liquefaction of the salty-type pore-forming agent needs to be performed at a temperature considerably higher than the temperature which caused melting of the polymer component. In addition, the salt-type per-forming agent, even when liquefied by melting, is incompatible with the polymer component which is an organic compound and, hence, is difficult to disperse homogeneously in the polymer component. In contrast, an organic compound used as the pore-forming agent can readily be dispersed in the polymer component assuming a liquid state due to their superior compatibility with each other. This results in a homogeneous porous product.

Examples of specific organic compounds for use as the meltable-type pore-forming agent include polyvalent alcohols having 2 to 5 carbon atoms such as pentaerythritol, L-erythritol, D-erythritol, meso-erythritol, and pinacol; and urea. Among these, polyvalent alcohols, especially pentaerythritol, are preferable. Use of any such polyvalent alcohol makes it possible to use water as the solvent by virtue of its hydrophilic nature. As to pentaerythritol, it typically melts at 180° C. to 270° C. though depending on the purity thereof and hence provides a broader selection of the polymer component. Besides, since pentaerythritol solidifies rapidly, a resulting solid molded product can be cooled in a shortened time period, thus contributing to a higher productivity.

The meltable-type pore-forming agents described above may be used either alone or as a mixture of two or more of them. Where two or more of the meltable-type pore-forming agents are mixed, a combination of such materials has to be selected such that they have a substantially common melting temperature and can be eluted by a common solvent. When water is used as the solvent, an appropriate conventional salt-type pore-forming agent may be combined with an appropriate meltable-type pore-forming agent. From the standpoint of melting, however, a combination with any salt-type pore-forming agent is not recommendable.

The amount of the meltable-type pore-forming agent to be blended with the polymer component can be appropriately adjusted depending on the porosity of an intended porous product. Thus, according to the method of the present invention, the porosity can be controlled by adjusting the amount of the pore-forming agent to be used without any limitation imposed by the fluidity of a molding material, unlike the prior art desalting method. Accordingly, the method of the present invention is capable of producing a porous product having a porosity as high as 50 to 99% by blending the meltable-type pore-forming agent in an amount such as to assume a volume ratio of 50 to 99% by volume relative to the total volume of the molding material. With the conventional desalting method using the salt-type pore-forming agent, it is impossible to produce a porous product having such a high porosity by injection molding or extrusion molding. For the production of a porous product substantially free of any residual meltable-type pore-forming agent, the meltable-type pore-forming agent to be blended preferably amounts to 65% or more by volume in the molding material.

The polymer component for use in the present invention may be any polymer which can provide a molding material in a liquid state or can be molded in a liquid state. With such a polymer component capable of assuming a liquid state, it is possible to prepare a molding material having the meltable-type pore-forming agent substantially evenly dispersed therein, hence, to produce a porous product having pores evenly distributed over the entirety thereof. Examples of such polymer components that are capable of assuming a liquid state include thermoplastic resins and thermoplastic elastomers which can melt when heated, and thermosetting resins and rubber which can assume a liquid state at the beginning of molding and then be cured through crosslinking, such as prepolymers and liquid rubbers.

Examples of specific thermoplastic resins for use in the present invention include polyethylene, polystyrene, acrylonitrile (AS) resin, acrylonitrile-butadiene-styrene (ABS) resin, ethylene-vinylacetate copolymer (EVA) resin, ethylene.α-eolefin copolymer, polypropyrene, polyamide 6, polyamide 6,6, polycarbonate, and polyoxymethylene (POM). Among these, preferable are those which are suitable for injection molding or extrusion molding. These polymer components may be used alone or as a blend of two or more of them in the molding material.

Thermoplastic elastomers, in general, comprise soft segments exhibiting rubber elasticity and hard segments forming knots of a three-dimensional network. Since such thermoplastic elastomers exhibit rubber elasticity at room temperatures and becomes plasticized at a higher temperature, they are suitable for injection molding or extrusion molding. Examples of specific thermoplastic elastomers for use in the present invention include: polystyrene elastomers having hard segments of polystyrene and soft segments of polybutadiene, polyisoprene or a hydrogenated one of these; polyolefin elastomers having hard segments of polyethylene or polypropylene and soft segments of butyl rubber or EPDM (ethylene-propyrene-diene terpolymer); polyamide elastomers having hard segments of polyamide and soft segments of polyester or polyether; polyester elastomers having hard segments of polyester and soft segments of polyether; and polyurethane elastomers having hard segments of polyurethane block having a urethane bond and soft segments of polyester or polyether. These elastomers may be used either alone or as a mixture of two or more of them, or alternatively in combination with at least one of the foregoing thermoplastic resins.

Where the polymer component used in the present invention is a thermosetting resin, a liquid prepolymer, which is a precondensate, may be used as the polymer component and then caused to be cured through crosslinking in the molding process. Examples of such thermosetting resins include urethane prepolymers, unsaturated polyester resins, epoxy resins, novolac resins and resol resins. These may be used in combination with any appropriate curing agent, or allowed to be cured through dynamic crosslinking in injection or extrusion.

Examples of specific rubbers for use in the present invention include natural rubber, synthetic rubbers such as ethylene-propyrene-diene terpolymer (EPDM), butadiene rubber (BR), isoprene rubber (IR), styrene-butadiene rubber (SBR) and acrylonitrile-butadiene rubber (NBR), and liquid rubbers depolymerized to have a low molecular weight. Among these, liquid rubbers are preferable in terms of their applicability to injection molding or extrusion molding.

The proportion of the polymer component in the molding material can be appropriately adjusted depending on the porosity of an intended porous product. The method of the present invention is particularly useful for the production of a porous product having a porosity of not less than 50%. In case of the production of such a porous product, the amount of the polymer component in the molding material preferably ranges from 1 to 50% by volume, particularly 5 to 35% by volume based on the volume of the resulting molded product.

The molding material for use in the present invention may comprise, in addition to the foregoing polymer component and the pore-forming agent, an age registor, a plasticizer, a thermal stabilizer, a lubricant, a thickener, a flame-retardant, an antioxidant, a UV absorber, a coloring agent, an antistatic agent, a reinforcer or a like additive, as required. Preferably, such an additive is added in an amount of not more than 60 parts by weight based on 100 parts by weight of the polymer component. To a thermosetting resin or rubber may be added, as required, a crosslinking-causing compound for curing the polymer component such as a vulcanizer or vulcanization accelerator, or a curing agent, a crosslinking agent or the like, though such a resin or rubber can be cured through dynamic crosslinking or crosslinking based on heat reaction.

Where the polymer component is blended with the pore-forming agent and additives, the molding material is prepared by further dispersing the additives. Preferably, the preparation of the molding material is performed by kneading or mixing with use of a machine such as oven roll, kneader, intensive mixer, single screw extruder or twin screw extruder. Prior to such kneading or mixing, the components of the molding material may be premixed using such a mixer as Henschel mixer, twin-cylinder mixer, ball mill, ribbon blender or tumble mixer.

The molding material thus prepared is molded using a molding machine or an extruder to form a solid molded product. The temperature at which the molding is performed (molding temperature) is a temperature which allows the polymer component to be molded and causes the meltable-type pore-forming agent to melt. The temperature allowing the polymer component to be molded, though varying depending on the polymer component to be used, is a temperature at which the thermoplastic resin or elastomer melts, if they are used as the polymer component, or at which the rubber or the thermosetting resin can be cured through crosslinking, if they are used as the polymer component. Generally, such a temperature preferably ranges from 100° C. to 300° C.

The solid molded product may be formed by any process, for example, compression molding, transfer molding, injection molding, extrusion molding, blow molding, calendering and casting, without particular limitation. Among these, injection molding and extrusion molding are preferable in terms of their higher productivity. The injection molding is a process where a molten material plasticized and kneaded by a screw in a heating cylinder is injected with high speed and pressure into a mold shaped as desired and then solidified by cooling or by reaction to form a molded product. Since melting and kneading are performed in the heating cylinder of the injection molding machine, there is no need to previously prepare the molding material having the meltable-type pore-forming agent dispersed in the polymer component. Further, since the pore-forming agent used in the present invention assumes a molten state at molding, injection of the molding material can be achieved without separation of the pore-forming agent from the polymer component. Not only injection molding but also extrusion molding is preferably employed because it achieves melting-kneading and molding continuously and allows the molding material to pass through the extrusion die as having the pore-forming agent dispersed in the polymer component, thereby providing a homogeneous molded product.

The conditions for injection molding or extrusion molding may be appropriately determined depending on the polymer component and pore-forming agent used and their proportions. For instance, the feeding pressure and the injection speed can be determined as follows.

Generally, the number of revolutions of the screw is set to about 100 rpm so that the molding material is fed neither excessively nor insufficiently. If the rotary speed of the screw is higher than desired, the molding material may be fed insufficiently, resulting in entrapment of air and other disadvantages. For stable metering of the molding material, pressure is applied to a hydraulic cylinder when the screw operates. Such pressure preferably ranges from 5 to 10 kgf/cm$^2$. The injection speed in a charging process may be adjusted to be higher when the intended molded product is thin, or to be lower when the intended molded product is thick. In a dwelling process, the dwelling pressure is set lower than the charging pressure. However, it is required that the dwelling pressure for forming a thin molded product is lower than that for forming a thick molded product because thin molded products are less susceptible to a sink (or sinkmark) that may be caused by solidification based on cooling as compared to thick molded products, which shrink or sink largely. For higher productivity, the mold temperature may be set lower to allow more rapid cooling. However, it is possible that such a lowered mold temperature causes the fluidity of the molding material to decrease thereby giving rise to charging deficiency or degrading the luster of surface of a resulting molded product. Thus, the mold temperature may be determined based on the polymer component in the molding material, taking such possible problems into consideration.

The molded product thus formed is soaked with a solvent that dissolves the meltable-type pore-forming agent but fails to dissolve the polymer component.

The solvent for use in the invention may be appropriately selected depending on the polymer component and pore-forming agent to be used. Examples of specific solvents include water, glycol, glycol ether, high-molecular-weight alcohol, fatty acid, fatty ester, glycol ester, mineral oil, petrol, alcohol ethoxylate, polyoxyethylene ester, glycerol, and glycerol ester. Since use of an organic solvent requires additional equipment for any post-treatment or the like, it is desirable that such a combination of the polymer component and the pore-forming agent be selected as to allow use of water as the solvent which does not require such equipment. Where a polyvalent alcohol is used as the meltable-type pore-forming agent, water can advantageously be used as the solvent.

The soaking process is executed by washing, dipping, immersing, or its equivalent with the above-mentioned solvent. The soaking process using the solvent causes the meltable-type pore-forming agent contained in the molded product to be dissolved in the solvent and eluted. In the soaking process, the meltable-type pore-forming agent that is present in the superficial part of the molded product is first eluted to form recesses, and then the solvent gradually penetrates deeper into the molded product from the formed recesses to elute the meltable-type pore-forming agent that is present in an inner part of the molded product. In this way, a product having individually minute pores leading to the outside of the porous product, namely an open cell type porous product, is obtained.

A porous product thus produced according to the method of the present invention may be used, for example, as an ear plug, shock absorber, heat-insulating material, filler, puff for cosmetic use, and filters. These applications depend on the polymer component used. Porous products obtained by the method of the present invention have an excellent gas permeability based on their many open cells and in addition, most of the pore-forming agent contained in a molded product is removed by the soaking process. Thus, such porous products can find applications, for example, as an ear plug or a cosmetic puff, which require hygienic qualities and safety for a human body. Further, the method of the present invention enables control of the porosity of an intended porous product by adjusting the amount of the meltable-type pore-forming agent to be blended in the molding material and is capable of providing a homogeneous porous product having pores distributed substantially homogeneously over the entirety thereof. Besides, such pores are individually minute. Thus, such a porous product obtained by the method of the present invention is superior to those obtained using conventional blowing agents in physical properties such as sound insulating properties, barrier properties and cushioning properties, and hence can advantageously be used as a high-performance filter.

EXAMPLES

Evaluation and Measurement

In the following examples, evaluation and measurement were performed as follows.

1. Fluidity (Melt Flow Rate)

Melt flow rate (MFR) was determined according to JIS K 7210. Specifically, a test material was put into a cylinder having a bore of 9.55 mm and a length of 160 mm immediately under which was coupled a die having an inside diameter of 2.095 mm and a length of 8 mm, and enclosed with a piston from above, followed by preheating at 230° C. for 10 minutes. Thereafter, a load of 5 kgf was imposed on the piston to extrude the test material. An amount of test material extruded was measured. From the results of the measurement, the extruded amount of the test material per 10 minutes was calculated to determine the melt flow rate (MFR) of the test material.

2. Volume Ratio (%) of the Pore-forming Agent in a Molding Material

First, the volume and weight of the molding material were measured. The molding material was then washed to elute the pore-forming agent contained therein, and the resultant was weighed. From the difference in weight between the pre-washing state and post-washing state of the molding material and the specific gravity of the pore-forming agent, the volume of the pore-forming agent was calculated. The volume thus calculated was divided by the volume of the molding material to determine the volume ratio (vol %) of the pore-forming agent.

3. Apparent Density ($g/cm^3$) of a Porous Product

According to JIS A 9511, a test piece sized about 200 mm×200 mm of the porous product was dried at 70±5° C. to have a constant weight W. The apparent density of the porous product was calculated from the weight W and volume V of the porous product including pores using the following equation:

$$\text{Apparent density } (g/cm^3) = W/V$$

4. ASKER F Hardness of a Porous Product

A sample having a flat surface sized 80 mm×80 mm and a thickness of 20 mm was prepared and measured for its ASKER F hardness using an ASKER F-type hardness tester manufactured by KOBUNSHI KEIKI KABUSHIKI KAISHA.

5. Tensile Strength and Elongation of a Porous Product

The porous product was measured for its tensile strength (MPa) and elongation(%) according to JIS K 6251.

6. Porosity (%) of a Porous Product

The weight W determined as in the above item 3 of the porous product was divided by the specific gravity of a raw material for skeleton of a porous product to give the volume $V_1$ of the porous product taking no account of pores thereof. The raw material corresponds to a material resulting from removal of the meltable-type pore-forming agent from the molding material. From the volume $V_1$ and the volume V determined as in the above item 3, the porosity (%) of the porous product was calculated using the following equation:

$$\text{Porosity of the porous product} = 100 - (V_1/V) \times 100$$

Example 1

A polystyrene elastomer (trade name: HYBRAR 7125, a product of KURARE CO.) as the polymer component in an amount of 100 parts by weight and pentaerythritol manufactured by MITSUI CHEMICALS, INC. as the meltable-type pore-forming agent in an amount of 350 parts by weight were evenly mixed using a mixer. The pentaerythritol can start melting at about 185° C. The resulting mixture was kneaded at 210° C. using a twin-screw extruder and then pelletized using a pelletizer. The molding material thus pelletized was measured for its melt flow rate and the volume ratio (vol %) of the pore-forming agent.

Injection molding was performed at 230° C. using the pellet thus prepared to form a solid molded product. After cooling, the solid molded product was washed to elute the pentaerythritol contained therein to produce a porous product.

The molding material (pellet) and the porous product were measured and evaluated for their physical properties according to the method of evaluation described above. The results are collectively shown in TABLE 1.

Examples 2 and 3

A pelletized molding material was prepared in the same manner as in EXAMPLE 1 except that a mixture of the polystyrene elastomer (St elastomer) as used in EXAMPLE 1 and polypropyrene (PP) (trade name: J709W, a product of GRAND POLYMER CO., LTD.) was used as the polymer component and the amount of each of the components mixed was varied as shown in TABLE 1. In the same manner as in EXAMPLE 1, the resulting pellet was molded into a molded product, which was then washed to produce a porous product. The molding material (pellet) and the resulting porous product were measured for their physical properties in the same manner as in EXAMPLE 1. The results are shown in TABLE 1.

Comparative Example

The polystyrene elastomer and pentaerythritol as used in EXAMPLE 1 were melted and kneaded at 150° C. which was lower than the melting temperature of the pentaerythritol using a twin-screw extruder. This process failed to prepare a molding material in which the pentaerythritol was substantially evenly dispersed.

Further, the hopper of an injection molding machine was charged with 100 parts by weight of the polystyrene elastomer and 350 parts by weight of the pentaerythritol for injection molding at a cylinder temperature of 150° C. This process provided a malformed, non-homogeneous solid molded product due to insufficient injection.

As can be seen from TABLE 1, any one of the porous products (EXAMPLES 1 to 3) produced according to the method of the present invention each had individually minute pores with a porosity in proportion to the amount of pore-forming agent contained in the molding material. By contrast, the COMPARATIVE EXAMPLE provided nothing but a molded product that was non-homogeneous in itself and hence could not serve as a precursor of a desired porous product.

As has been described, the method of the present invention is capable of producing a porous product having minute pores evenly distributed with its porosity readily controlled by adjusting the amount of the meltable-type pore-forming agent to be blended in the molding material.

Further, the method of present invention enables an easy production of a porous product having a high porosity that cannot be attained by the conventional desalting method and that is homogeneous even in an inner part thereof.

Still further, the method of the present invention makes it possible to produce a porous product in which the pore-forming agent having been blended in the molding material for pore formation hardly remains and hence is suitable for producing a porous product to be brought into direct contact with a human body.

While certain presently preferred embodiments of the present invention have been described in detail, as will be apparent for those skilled in the art, certain changes and modifications may be made in embodiment without departing from the scope of the present invention as defined by the following claims.

What is claimed is:

1. A method of producing a porous product, comprising the steps of:

preparing a molded product by subjecting a molding material containing a polymer component and a pore-forming agent dispersed in the polymer component, the pore-forming agent assuming a solid state at a room temperature, to molding at a temperature which causes the molding material having the pore-forming agent to substantially completely melt; and soaking the molded product with a solvent which dissolves the pore-forming agent but fails to dissolve the polymer component, to form pores, wherein the pore-forming agent is a polyvalent alcohol having a melting point of 40° C. to 300° C. that melts

TABLE 1

|  |  |  | Example 1 | Example 2 | Example 3 | Comparative example |
|---|---|---|---|---|---|---|
| Molding material | Polymer component (part) | St elastomer | 100 | 85 | 70 | 100 |
|  |  | PP | — | 15 | 30 | — |
|  | Pore-forming agent (part) | Pentaerythritol | 350 | 350 | 350 | 350 |
|  | Volume ratio of pore-forming agent (vol %) |  | 70 | 70 | 70 | 70 |
|  | M F R (g/10 min) |  | 7.7 | 8.4 | 15.9 |  |
| Molding temperature (° C.) |  |  | 230 | 230 | 230 | 150 |
| Characteristic of porous product | Porosity (%) |  | 62 | 63 | 63 | — |
|  | Apparent density (g/cm³) |  | 0.34 | 0.34 | 0.34 | — |
|  | Hardness |  | 67 | 69 | 71 | — |
|  | Tensile strength (MPa) |  | 1.01 | 1.26 | 1.58 | — |
|  | Elongation (%) |  | 500 | 290 | 180 | — | at the molding temperature of the polymer component, and the molded product is prepared by injection molding or extrusion molding.

2. The method according to claim 1, wherein the pore-forming agent is pentaerythritol.

3. The method according to claim 1, wherein the solvent is water.

4. The method according to claim 1, wherein the polymer component is curable through crosslinking to form a molded product.

5. The method according to claim 1, wherein the polymer component is a thermoplastic resin or a thermoplastic elastomer.

6. The method according to claim 5, wherein the polymer component is a polystyrene elastomer.

7. The method according to claim 1, wherein the content of the polymer component ranges from 1 to 50 vol % based on the volume of the molding material, the content of the pore-forming agent ranges from 50 to 99 vol % based on the volume of the molding material, and the porous product has a porosity from 50 to 99% by volume.

8. A method of producing a porous product comprising the steps of:

forming a molding material in which pentaerythritol is dispersed in a thermoplastic resin or a thermoplastic elastomer into a molded product by molding the molding material at 180° C. or more so as to cause the molding material and the pentaerythritol to substantially completely melt; and soaking the molded product with water to form pores in the molded product.

* * * * *